Patented Dec. 26, 1933

1,940,819

UNITED STATES PATENT OFFICE 1,940,819

RUBBER COMPOSITION AND METHOD OF PRESERVING RUBBER

Waldo L. Semon, Cuyahoga Falls, Ohio, assignor to The B. F. Goodrich Company, New York, N. Y., a corporation of New York No Drawing. Application April 5, 1932
Serial No. 603,441

55 Claims. (Cl. 18—50)

This invention relates to the art of rubber manufacture, and particularly to the preparation of rubber compositions which resist the deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are secondary amino derivatives of biphenyl, binaphthyl, and related aromatic compounds containing two directly connected aromatic nuclei. The preferred compounds are those in which the amino group on a biphenyl nucleus is attached to another biphenyl or other aromatic nucleus. Other basic or neutral substituents including the radicals of ethers, alcohols, primary or tertiary amines, etc. may be present, and in some cases may even increase the anti-oxidant power of the compounds. However, strongly acidic substituent groups such as carboxyl or sulphonic acid groups which have the effect of greatly retarding vulcanization, and other inorganic elements, prove disadvantageous in general either because of a reduced or even a negative anti-oxidant power or because of an undesirably strong effect on the vulcanization of the rubber.

For example, the following substances are typical members of the class of substances outlined above: di-biphenylamine, phenylamino biphenyl, tolylamino biphenyl, naphthylamino biphenyl, tolylamino bitolyl, p-phenylamino phenyl-naphthalene, phenyl dimethyl benzidine, monophenyl benzidine, mononaphthyl benzidine, diphenyl benzidine, dinaphthyl benzidine, ditolyl benzidine, di-biphenyl benzidine, dimethyl benzidine, dibenzyl benzidine, diphenyl tolidine, dinaphthyl tolidine, diphenyl dianisidine, diphenyl naphthidine, dinaphthyl naphthidine, p-dimethylamino-phenylamino biphenyl, biphenyl anisidine, p-hydroxy phenylamino biphenyl, di-biphenyl ethylene diamine, di-biphenyl phenylene diamine, di-biphenyl diamino diphenyl methane, biphenylamino benzyl alcohol, etc.

In certain of these compounds the position of a substituent group has been indicated, but in all these cases as well as in the others in which no position is indicated any one of the possible positions may be selected, or a mixture of isomeric compounds may be used, of which some have the substituent in one position and some in another. For instance, the naphthylamino biphenyl referred to above may have the amino group attached to the naphthyl group in either the alpha or beta position, and to the biphenyl nucleus in either the ortho, meta or para position. However, the para compounds are generally preferred, or a mixture of the ortho and para in the proportions in which they naturally arise in the usual methods of preparation.

It will be understood that the term "biphenyl" is not here employed to refer to two separate phenyl groups, but rather to the biphenyl radical consisting of two distinct benzene rings connected by a single bond. The term "biaryl" is similarly employed in the appended claims to designate a radical containing two distinct ring nuclei connected to one another by a single bond.

The anti-oxidants of this invention may be prepared by means of any of the usual chemical reactions, such as the condensation of an amino biaryl with an aryl hydroxide. Thus, di beta-naphthyl benzidine is readily prepared by heating a mixture of benzidine and beta-naphthol until the condensation is effected with the elimination of water. Naphthylamino biphenyl is similarly prepared by nitrating and reducing biphenyl to give amino biphenyl (xenylamine), separating the para compound from the crude mixture, and heating it with beta-naphthol, or if desired, the mixture of ortho and para amino biphenyl may be reacted directly with beta-naphthol to give a product containing a mixture of ortho and para beta-naphthylamino biphenyl. The methods for the preparation of any of the other anti-oxidants of this invention will be obvious to any organic chemist.

Any one or a mixture of several of the above-enumerated substances or of these substances with other known anti-oxidants may be incorporated into rubber with good effect on its age-resisting properties. For example, from ¼ to 5% of such anti-oxidant may be mixed with the rubber before vulcanization, the anti-oxidant having substantially no accelerating effect and therefore ordinarily not necessitating an adjustment of vulcanizing conditions. Alternatively, the anti-oxidant may be applied to the surface of crude or vulcanized rubber, say in the form of a powder, paste, or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur 5.5 parts, zinc oxide 30 parts, gas black 40 parts, mineral rubber 10 parts, palm oil 5 parts, and hexamethylene tetramine 0.75 parts. This was divided into portions, some of which were used as controls. To each of the others was added 0.95 parts (0.5% of the weight of the composition) of one of the above-described anti-oxidants. The compositions were thoroughly mixed and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The results of the tests are given in the table below, in which T indicates ultimate tensile strength in pounds per sq. in. and E indicates ultimate elongation in per cent. of original length, each of the tests being accompanied by a control test of the composition without the anti-oxidant.

*Aging tests*

| Anti-oxidant | Before aging | | After 7 days in the Geer oven | | After 48 hrs. in Bierer-Davis bomb | |
|---|---|---|---|---|---|---|
| | T | E | T | E | T | E |
| None (control) | 3382 | 633 | 1608 | 447 | 779 | 330 |
| Beta-naphthyl amino biphenyl (mixed o and p) | 3365 | 663 | 2160 | 490 | 1751 | 520 |
| None (control) | 3565 | 653 | 1904 | 443 | 904 | 333 |
| Tolylamino bitolyl | 3367 | 667 | 2396 | 535 | 2213 | 573 |
| None (control) | 3630 | 686 | 1610 | 420 | 935 | 367 |
| Di-biphenyl p-phenylene diamine | 3435 | 653 | 3303 | 603 | 2754 | 577 |
| None (control) | 3329 | 620 | 1506 | 407 | 516 | 190 |
| Diphenyl 2.5 diamino biphenyl | 3365 | 650 | 2749 | 520 | 2206 | 495 |
| None (control) | 3597 | 660 | 1886 | 500 | | |
| Diphenyl diamino bi-naphthyl | 3555 | 697 | 2059 | 530 | | |
| None (control) | 3340 | 685 | | | 375 | 295 |
| Di-biphenylamine (para) | 3325 | 660 | | | 1990 | 565 |
| None (control) | 3940 | 607 | 2077 | 442 | 950 | 337 |
| Diphenyl benzidine | 3974 | 640 | 2935 | 530 | 2571 | 587 |
| None (control) | 3590 | 620 | | | 868 | 290 |
| Di-beta-naphthyl benzidine | 3526 | 680 | | | 2161 | 560 |

It is evident from the above examples that rubber compositions containing even small proportions of the anti-oxidants of this invention resist deterioration far more effectively than similar untreated compositions.

Obviously, the practice of this invention is not limited to the specific compositions given above, such compositions being merely illustrative of one manner of employing the anti-oxidants of this invention. The anti-oxidants may be employed in conjunction with other vulcanizing agents than those here specifically disclosed, for this invention is applicable generally to pure rubber or rubber compositions of the most varied nature.

It is to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

This application is a continuation in part of my co-pending application Serial No. 525,880 filed March 27, 1931.

While I have herein disclosed certain preferred manners of performing my invention, I do not thereby desire or intend to limit myself solely thereto, for as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a secondary amino biaryl compound.

2. The method of preserving rubber which comprises treating rubber with a secondary amino biphenyl compound.

3. The method of preserving rubber which comprises treating rubber with a secondary amino biphenyl compound consisting solely of the elements carbon, hydrogen, and nitrogen.

4. The method of preserving rubber which comprises treating rubber with an arylamino biphenyl compound consisting solely of the elements carbon, hydrogen, and nitrogen, each nitrogen atom constituting a secondary amino group.

5. The method of preserving rubber which comprises treating rubber with an arylamino biphenyl compound consisting solely of the elements carbon, hydrogen and nitrogen, and containing two amino nitrogens.

6. The method of preserving rubber which comprises treating rubber with a benzidine compound having a single hydrocarbon substitutent on at least one of the amino groups.

7. The method of preserving rubber which comprises treating rubber with a diaryl substituted compound of the benzidine group.

8. The method of preserving rubber which comprises treating rubber with a diaryl benzidine.

9. A method of treating rubber which comprises incorporating therein a dinaphthyl substituted benzidine.

10. A method of treating rubber which comprises subjecting it to vulcanization in the presence of a naphthyl substituted benzidine.

11. A method of preserving rubber which comprises subjecting it to vulcanization in the presence of a material having the formula

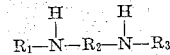

in which R₁ and R₃ are naphthyl radicals and R₂ is a biphenyl nucleus.

12. A method of preserving rubber which comprises subjecting it to vulcanization in the presence of a material having the formula

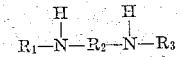

in which R₁ and R₃ are naphthalene groups and R₂ is a material selected from a group consisting of biphenyl and methyl substituted biphenyl.

13. A method of preserving rubber which comprises subjecting it to vulcanization in the presence of di-beta naphthyl substituted benzidine.

14. A method of preserving rubber which comprises subjecting it to vulcanization in the presence of a naphthyl substituted material selected from a class consisting of benzidine and methyl substituted benzidine.

15. The method of preserving rubber which comprises treating rubber with diphenyl benzidine.

16. The method of preserving rubber which comprises treating rubber with an arylamino biphenyl.

17. The process of preserving rubber which comprises treating rubber with a naphthylamino biphenyl compound.

18. The process of preserving rubber which comprises treating rubber with a naphthyl substituted p-amino biphenyl compound.

19. The method of preserving rubber which comprises vulcanizing a composition comprising rubber, sulfur, an active organic accelerator, and a secondary arylamino biaryl compound.

20. The method of preserving rubber which comprises vulcanizing a composition comprising rubber, sulphur, an active organic accelerator, and an arylamino biphenyl containing two amino groups.

21. A composition comprising rubber and a secondary amine in which at least one secondary amino nitrogen is directly attached to a group consisting of two distinct, but directly connected, aromatic ring structures.

22. A composition comprising rubber and a secondary arylamino biaryl compound.

23. A composition comprising rubber and a secondary amino biphenyl compound consisting solely of the elements carbon, hydrogen, and nitrogen.

24. A composition comprising rubber and an arylamino biphenyl compound consisting solely of the elements carbon, hydrogen, and nitrogen, each nitrogen atom constituting a secondary amino group.

25. A composition comprising rubber and a benzidine compound having a single hydrocarbon substituent on at least one of the amino groups.

26. A composition comprising rubber and a diaryl benzidine.

27. A rubber product that has been vulcanized in the presence of a naphthyl substituted derivative of the benzidine group.

28. A rubber product that has been vulcanized in the presence of a material having the formula $$R_1-\underset{H}{N}-R_2-\underset{H}{N}-R_3$$

in which $R_1$ and $R_3$ are naphthyl groups and $R_2$ is a biphenyl radical.

29. A rubber composition comprising rubber and di-beta naphthyl benzidine.

30. A composition comprising rubber and a substance selected from the class consisting of diphenyl benzidine and its homologues.

31. A vulcanized rubber composition which has been vulcanized in the presence of diphenyl benzidine.

32. A composition comprising rubber and an arylamino biphenyl.

33. A vulcanized rubber composition which has been vulcanized in the presence of a secondary amino biphenyl compound.

34. A rubber composition comprising rubber and a naphthylamino biphenyl compound.

35. The method of preserving rubber which comprises treating rubber with a diamine in which at least one amino group is a secondary amino group directly attached to a biaryl group.

36. The method of preserving rubber which comprises treating rubber with a diamine in which each amino group is a secondary amino group directly attached to a biaryl group.

37. The method of preserving rubber which comprises treating rubber with a secondary diamine in which the substituents on the amino group are all aromatic in nature and each amino group is directly attached to at least one biaryl group.

38. The method of preserving rubber which comprises treating rubber with a secondary aromatic amine containing at least two biaryl groups each of which is directly attached to at least one secondary amino nitrogen atom.

39. The method of preserving rubber which comprises treating rubber with a diaryl substituted diamino biaryl.

40. A method of treating rubber which comprises subjecting it to vulcanization in the presence of diphenyl benzidine.

41. The method of preserving rubber which comprises treating rubber with a diamino biaryl having a non-conjugated aryl group associated therewith as a substituent.

42. The method of preserving rubber which comprises treating rubber with an organic diamine having a substituent attached to one of the nitrogen atoms consisting of two distinct, but directly connected aromatic ring structures.

43. The method of preserving rubber which comprises treating rubber with a biaryl substituted aromatic diamine.

44. The method of preserving rubber which comprises treating rubber with a di-biaryl substituted phenylene diamine.

45. The method of preserving rubber which comprises treating rubber with di-biphenyl p-phenylene diamine.

46. The method of preserving rubber which comprises treating rubber with an aryl substituted p-amino biphenyl compound.

47. The method of preserving rubber which comprises vulcanizing rubber in the presence of a secondary diamine in which each amino group is attached to a biphenyl group in the para position.

48. A composition comprising rubber and a diamine in which at least one amino group is a secondary amino group directly attached to a biaryl group.

49. A composition comprising rubber and a secondary diamine in which the substituents on the amino groups are all aromatic in nature and each amino group is directly attached to at least one biaryl group.

50. A composition comprising rubber and a secondary aromatic amine containing at least two biaryl groups each of which is directly attached to at least one secondary amino nitrogen atom.

51. A composition comprising rubber and a diaryl substituted diamino biaryl.

52. A composition comprising rubber and a secondary organic diamine having a substituent attached to one of the nitrogen atoms consisting of two distinct but directly connected aromatic ring structures.

53. A composition comprising rubber and a biaryl substituted phenylene diamine.

54. A composition comprising rubber and di-biphenyl p-phenylene diamine.

55. A composition comprising rubber and an aryl substituted p-amino biphenyl.

WALDO L. SEMON.